United States Patent [19]

Landt

[11] Patent Number: 4,853,705

[45] Date of Patent: Aug. 1, 1989

[54] BEAM POWERED ANTENNA

[75] Inventor: Jeremy A. Landt, Los Alamos, N. Mex.

[73] Assignee: Amtech Technology Corporation, Santa Fe, N. Mex.

[21] Appl. No.: 192,827

[22] Filed: May 11, 1988

[51] Int. Cl.[4] .............................................. H01Q 9/26
[52] U.S. Cl. .................................... 343/803; 343/701; 343/834
[58] Field of Search .............. 343/701, 703, 803, 802, 343/804, 807, 700 MS, 795, 741–744, 829, 834, 846, 835; 455/269, 272, 274; 324/95, 119; 340/572

[56] References Cited

U.S. PATENT DOCUMENTS 2,943,189  6/1960  Crump ................................ 343/803
4,207,518  6/1980  Hopfer ............................... 324/119
4,647,849  3/1987  Strickland et al. ................. 324/95

FOREIGN PATENT DOCUMENTS 116054  10/1978  Japan ................................. 343/795

Primary Examiner—Rolf Hille
Assistant Examiner—Michael C. Wimer
Attorney, Agent, or Firm—Blakely, Sokoloff, Taylor & Zafman

[57] ABSTRACT

The invention relates to an antenna for receiving and modulating transmitted signals having a very low power density on the order of below 1 watt per meter squared, at a selected center frequency above 2,000 MHz. The antenna uses a folded planar dipole section having two separated oppositely disposed U-shape elements, each of said elements having a pair of ends. A capacitor is series-coupled between two of the oppositely disposed ends of the elements, and a diode having a high impedance at the selected center frequency is series-coupled between the other two oppositely disposed ends of the U-shape elements. A metallic backplane is mounted parallel to the planar folded dipole section and spaced from the dipole section a predetermined distance selected to reduce the antenna impedance. The impedance of the diode, the shape of the folded planar diode section and the predetermined amount of spacing of the backplane from the planar folded dipole section are all selected to increase the d.c. power output of the antenna.

16 Claims, 1 Drawing Sheet

BEAM POWERED ANTENNA

BACKGROUND OF THE INVENTION

The field of this invention is the identification of remote objects, often moving objects. In the past, this has been accomplished by the transmission of an r-f signal to a remote tag. The tag contains the electronic identity of the object, or other information. The tag is a powered antenna which serves to modulate and reflects the transmitted beam. The reflected modulated beam is received at the transmitter where the information from the tag is decoded. Systems of this type are described in U.S. Pat. No. 4,075,632 and Copending U.S. patent application Ser. Nos. 885,248, filed July 14,1986, (now U.S. Pat. No. 4,739,328) and 135,048 filed Dec. 18, 1987, all assigned to the same assignee as his invention.

In the past there have been two kinds of tags: one is battery powered and the other is powered by the transmitted beam. Battery powered tags have the disadvantage of required periodic battery or tag replacement. Moreover, occasionally a battery will be come inoperative much earlier than normal, leaving the remote object with no means of being identified.

U.S. standard frequency for transmitted microwave signals for industrial, scientific and medical uses (ISM), the one used for remote object identification require, is a center frequency of 915 MHz. At this frequency, it has been possible to develop a tag powered by the beam alone without a battery. However, various other countries, such as Japan and France, legislate an ISM microwave center frequency much higher, above 2000 MHz. In Japan and France, the ISM standard is 2450 MHz. For reasons which will be explained, it has been impossible to develop an antenna at that frequency capable of a reasonable transmission range, in excess of 1 meter, which does not require battery power.

Without battery power, the antenna must collect its transmission energy solely from the transmitted signal, thus obtaining sufficient output power to run the modulator circuit. The modulator circuit modulates the antenna backscatter cross-section and reflects the resultant signal to the transmitter in order to communicate the circuit's unique identification code (a digitally stored number).

The maximum power available at the antenna is governed by two factors. The power is equal to the effective aperture (A) of the antenna multiplied by the power density incident on antenna in watts per square meter. The size of the effective aperture A is inversely proportional to the square of the frequency of the transmitted microwave signal. Thus, the higher the transmitted frequency, the smaller the aperture. However, the transmitted frequency, as discussed earlier, is fixed by regulation. The frequency may not vary significantly from a prescribed value of 2450 MHz in Japan and France or 915 MHz in the United States. Moreover, in Japan, the maximum transmitted power is only 0.3 watts in comparison to a power in excess of 2 watts in the United States. For both of these reasons, the available power at the antenna in Japan or France is greatly reduced from that available in the United States.

As an additional complication, as the transmitted frequency gets higher, the parasitics of the antenna circuit elements in the antenna become much more critical. The choice of microwave diode is very critical. Tuning the circuit also becomes more difficult.

As a result, for use in countries employing the high frequency standard, tags have required batteries to provide sufficient power to achieve the desired minimum transmission ranges of at least 2 meters.

The possibility has been considered of using a phased array of multiple antennas to increase the gain, and thus the effective aperture and the output power. However, phased arrays are undesireable in many applications because they make the antenna too directional.

Folded dipole antennas were also considered, but they were thought to be inadequate because the impedance of a folded dipole antenna would be too high compared with the parasitic impedances of the microwave diodes used for conversion of r-f to d.c. The parasitic impedance of the microwave diode forms a voltage divider with the antenna impedance, and that divides the power and reduces the power delivered to the output. Such folded dipole antennas have previously been used at microwave frequencies (2450 MHz) for checking stray, undesirable transmission from microwave ovens. However, such a checker is located only a few inches from the source of microwave energy and the transmission levels sought to be detected thus were relatively high, on the order of 5 milliwatts per square centimeter. Therefore the antenna parasitics were not at all critical. The available power at such a short range was adequate even if substantial power were lost as a result of the parasitics.

In the present invention, the beam power used to power the antenna is very low, more than two orders of magnitude less that the power outside of any microwave oven which even marginally exceeds regulation (the ones which require the generation of an output "danger" signal from the antenna). Therefore, what is required is a low antenna impedance and a high diode parasitic impedance, thereby maximizing the voltage across the diode and thus the output power. Accordingly, folded dipole antennas were ruled out.

BRIEF DESCRIPTION OF THE INVENTION

Unexpectedly, it was discovered that by combination of a ground plane, critically placed with respect to the antenna, the impedance of a folded dipole antenna could be reduced sufficiently to significantly increase the power out from the antenna. By combining this antenna impedance decrease with careful selection of an output diode having a high impedance, the output power was dramatically increased.

In a preferred embodiment of the invention, two or more of these antennas are series d.c. coupled to further increase antenna power. By using d.c. coupling as opposed to phased arrays, the undesirable directionality is not increased.

Briefly, the antenna of the invention is designed for receiving and modulating transmitted signals having a very low power density, on the order of below about 1 watt per meter squared, at a selected center frequency above about 2000 MHz. To accomplish this, a folded planar dipole section is used having two separated, oppositely disposed U-shaped elements, each having a pair of ends. A capacitor is series coupled between two oppositely disposed ends of the two U-shaped elements. A diode having a high impedance at the selected center frequency is series coupled between the other two oppositely disposed ends of the two U-shaped elements. Finally a metallic backplane is mounted parallel to the plane of the planar folded dipole section and spaced a predetermined distance from that plane, such distance selected to reduce the antenna impedance.

In accordance with this invention, the type and impedance of the diode, the shape of the folded planar dipole section and the choice of the amount of spacing between the dipole section and the backplane are all selected to increase the d.c. power output of the antenna.

In a preferred embodiment of the invention, two or more dipole sections can be connected in d.c. series. Moreover, the capacitor may be selected to have a low impedance at the center frequency of the transmitted signal. In addition, a matching section may be connected between the folded dipole section and the diode in order to better match the impedance of the diode to the impedance of the antenna.

DETAILED DESCRIPTION OF THE INVENTION

Figure 1:
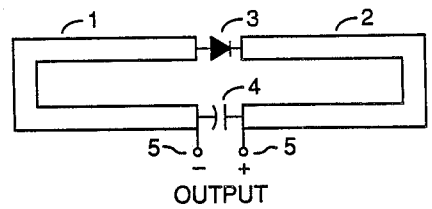
FIG. 1 is a plan view of the folded dipole section, shown somewhat in schematic, of the antenna of one embodiment of the invention.

Referring to FIG. 1, the dipole antenna of the invention is comprisd of two U-shaped elements 1 and 2, disposed opposite each other as shown. Diode 3 is connected in series between two oppositely disposed ends of U-shaped elements 1 and 2, as shown. Diode 3 has a high impedance, preferably above about 100 ohms, at the selected center frequency. As discussed above, for use in Japan or France, the selected center frequency is 2450 MHz. Diodes operating at this frequency are preferably Schottky diodes, for example Schottky diode HSCH-6330 manufactured by Hewlett Packard Company.

Capacitor 4 is series-coupled between the other two oppositely disposed ends of U-shaped elements 1 and 2, as shown. This capacitor is selected to have a low impedance at the selected center frequency. A capacitor which operates well is No. 2100722, 22 picofarads at 50 volts, manufactured by Mouser Capacitor Division in Taiwan.

The antenna of the invention receives a signal, such as the 2450 MHz signal which has been described. This signal causes currents to flow on both elements 1 and 2. These currents flow unimpeded through capacitor 4, which was selected to have a low impedance at the selected center frequency. Through the diode 3, however, current can flow in one direction, but not in the other. In the embodiment illustrated, current flows through diode 3 from left to right, but not in reverse. Since d.c. current cannot flow through capacitor 4, a charge will build up on the capacitor, the plus side being on the right, as shown.

The purpose of the antenna is to gather enough power to present a voltage of about 1.5 volts and a current of about 100 microamps at the output which appears at output terminals 5 across capacitor 4. This power is used to power the electronic identification circuit (not shown) which will be connected to terminals 5. The identification circuit, powered by the antenna of the invention, changes the load across capacitor 4 in a predetermined fashion, which results in changed r-f currents on elements 1 and 2 of the antenna. This causes the antenna to produce reflected fields, modulated by the identification code stored in the identification circuit. All of this is described in U.S. Pat. No. 4,075,632 assigned to the same assignee as this invention.

Figure 2:
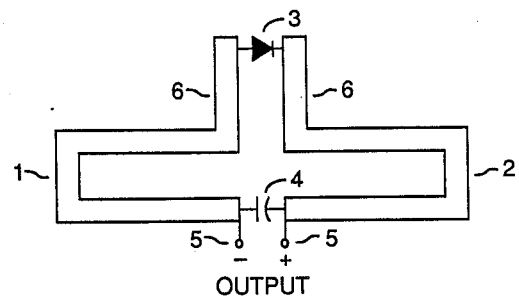
FIG. 2 is a plan view of the folded dipole section, shown somewhat in schematic, of the antenna of another embodiment of the invention.

Referring to FIG. 2, another embodiment of the invention is shown. It operates exactly like the one in FIG. 1, and all of the elements are numbered identically. The difference is the addition of a matching section comprised of a pair of conductive lines 6, one end of which is coupled respectively to each of the ends of U-shaped elements 1 and 2 which were connected to diode 3 in FIG. 1. The diode 3 is series-coupled across the other ends of the matching section 6. The matching section 6 is used, if required, to obtain a better match of the impedance of the diode 3 to the impedance of the antenna.

Figure 3:
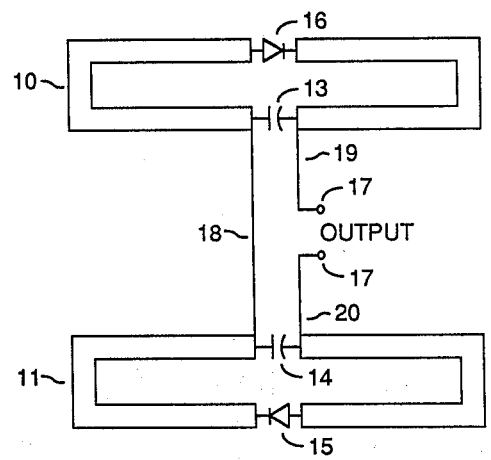
FIG. 3 is a plan view of the folded dipole section, shown somewhat in schematic, of the antenna of a preferred embodiment of the invention.

The preferred embodiment of FIG. 3 shows two dipole sections 10 and 11 coupled together in d.c. series. These two sections 10 and 11 are separated from each other by at least one-third of a wavelength of the transmitted signal, preferably by at least one-half wavelength. At 2450 MHz, this would amount to a distance greater than about 4 centimeters. The individual arrays may use dipole elements of the same geometry, and may use the same type of diode and capacitors for both capacitors 13 and 14, and for both diodes 15 and 16, or they may be different. The choice depends upon the precise power and frequency of the transmitted signal, as well as upon the availability of necessary components. The output signal from the antenna of FIG. 3 appears at terminals 17. The dipoles 10 and 11 are connected by lines 18, 19 and 20.

Figure 4:
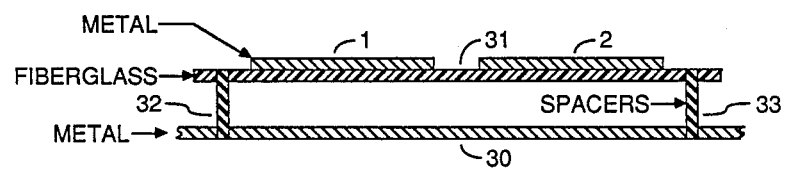
FIG. 4 is a cross-sectional view showing the mounting of the folded dipole section of the antenna of this invention spaced from the metallic backplane.

FIG. 4 shows the mounting of the dipole elements 1 and 2 on metallic backplane 30. Dipole elements 1 and 2 are mounted on a conventional printed circuit board substrate 31, usually made of fiberglass epoxy. The p.c. board substrate 31 is attached to and spaced from metallic backplane 30 by two insulating spacers 32 and 33, as shown. The distance between substrate 31 and backplane 30 is very important to the invention. It should be a distance equal to between about one-tenth and one-quarter wavelength of the transmitted signal. If that signal has a frequency of 2450 MHz, this distance should be between about 1 and 3 centimeters.

Although the invention has been described in terms of its preferred embodiments, it should be understood that many modifications may be made without departing from the spirit and scope of the invention, as is recited in the claims which follow.

I claim:

1. An antenna for receiving and modulating transmitted signals having very low power density on the order of below about 1 watt per meter squared, at a selected center frequency above 2000 MHz, comprising:

a folded planar dipole section having two separated oppositely disposed U-shaped elements, each of said elements having a pair of ends;

a capacitor series coupled between two oppositely disposed ends of said two elements;

a diode having a high impedance at said selected center frequency, series coupled between the other two oppositely disposed ends of said two elements;

a metallic backplane mounted parallel to said planar folded dipole section and spaced therefrom by a predetermined distance selected to reduce the antenna impedance, the impedance of said diode, the shape of said folded planar dipole section and the predetermined amount of spacing of said backplane from said planar folded dipole section all being selected to increase the d.c. power output of the antenna.

2. The antenna of claim 1 further characterized by the capacitor being selected to have a low impedance at said selected center frequency.

3. The antenna of claim 2 further characterized by said diode being selected to have an impedance above about 100 ohms at said selected center frequency.

4. The antenna of claim 3 further characterized by said diode being a Schottky barrier diode.

5. The antenna of claim 1 further characterized by the predetermined spacing between said planar folded dipole section and said backplane being a distance equal to between one-tenth and one-quarter wavelength of the transmitted signal.

6. An antenna for receiving and modulating transmitted signals having very low power density on the order of below about 1 watt per meter squared, at a selected center frequency above 2000 MHz, comprising:
a folded planar dipole section having two separated oppositely disposed U-shaped elements, each of said elements having a pair of ends;
a capacitor series coupled between two oppositely disposed ends of said two elements;
a matching section consisting of two conductive lines, one end of each line coupled to each of the other two oppositely disposed ends of said two U-shaped elements;
a diode having a high impedance at said selected center frequency, series coupled between the other ends of said two conductive lines of said matching section;
a metallic backplane mounted parallel to said planar folded dipole section and spaced therefrom by a predetermined distance selected to reduce the antenna impedance, the impedance of said diode, the shape of said folded planar dipole section and the predetermined amount of spacing of said backplane from said planar folded dipole section all being selected to increase the d.c. power output of the antenna.

7. The antenna of claim 6 further characterized by the capacitor being selected to have a low impedance at said selected center frequency.

8. The antenna of claim 7 further characterized by said diode being selected to have an impedance above about 100 ohms at said selected center frequency.

9. The antenna of claim 8 further characterized by said diode being a Schottky barrier diode.

10. The antenna of claim 6 further characterized by the predetermined spacing between said planar folded dipole section and said backplane being a distance equal to between one-tenth and one-quarter wavelength of the transmitted signal.

11. The antenna of claim 1 further characterized by the addition of a second planar folded dipole section connected in d.c. series with the first section, said second dipole section also having a diode and a capacitor and being mounted with the same spacing on the same backplane mounting.

12. The antenna of claim 11 further characterized by said second diode and said second capacitor being the same types as the ones in said first folded dipole section.

13. The antenna of claim 11 further characterized by the spacing between the first and second dipole sections being a distance of at least one-third wave length at said selected frequency.

14. The antenna of claim 6 further characterized by the addition of a second planar folded dipole section connected in d.c. series with the first section, said second dipole section also having a diode and a capacitor and being mounted with the same spacing on the same backplane mounting.

15. The antenna of claim 14 further characterized by said second diode and said second capacitor being the same types as the ones in said first folded dipole section.

16. The antenna of claim 14 further characterized by the spacing between the first and second dipoles sections being a distance of at least one-third wave length at said selected frequency.

* * * * *